US008654471B2

(12) United States Patent
Springberg et al.

(10) Patent No.: US 8,654,471 B2
(45) Date of Patent: Feb. 18, 2014

(54) DISK-BASED STORAGE DEVICE HAVING WRITE SIGNAL COMPENSATION FOR MAGNETIZATION POLARITY OF ADJACENT BITS

(75) Inventors: David M. Springberg, Fort Collins, CO (US); Boris Livshitz, Eagan, MN (US); Jason S. Goldberg, Saint Paul, MN (US)

(73) Assignee: LSI Corporation, San Jose, CA (US)

( * ) Notice: Subject to any disclaimer, the term of this patent is extended or adjusted under 35 U.S.C. 154(b) by 227 days.

(21) Appl. No.: 13/250,419

(22) Filed: Sep. 30, 2011

(65) Prior Publication Data

US 2013/0083419 A1  Apr. 4, 2013

(51) Int. Cl.
G11B 5/02 (2006.01)

(52) U.S. Cl.
USPC .......................................................... 360/55

(58) Field of Classification Search
None
See application file for complete search history.

(56) References Cited

U.S. PATENT DOCUMENTS

| 4,525,753 | A |   | 6/1985  | Shimeki et al. |          |
|-----------|---|---|---------|----------------|----------|
| 5,084,858 | A |   | 1/1992  | Maeda          |          |
| 5,153,872 | A |   | 10/1992 | Maeda          |          |
| 5,559,786 | A |   | 9/1996  | Horimai et al. |          |
| 5,757,759 | A | * | 5/1998  | Takahashi et al. | 369/47.24 |
| 6,226,248 | B1 |  | 5/2001  | Koboyashi      |          |
| 6,307,823 | B1 |  | 10/2001 | Kobayashi      |          |
| 6,754,141 | B1 | * | 6/2004 | Uchida et al.  | 369/13.54 |
| 6,940,790 | B1 |  | 9/2005  | Powelson et al. |         |
| 7,490,212 | B2 |  | 2/2009  | Kasiraj et al. |          |
| 7,872,825 | B2 |  | 1/2011  | Sanghvi        |          |
| 2002/0191496 | A1 | | 12/2002 | Fujita et al. |          |
| 2003/0103290 | A1 | | 6/2003  | Atsumi        |          |
| 2006/0046011 | A1 | * | 3/2006 | Kahlman et al. | 428/64.4 |
| 2006/0072418 | A1 | * | 4/2006 | Kahlman       | 369/59.1 |
| 2006/0198041 | A1 | | 9/2006  | Kuwamura      |          |
| 2008/0174905 | A1 | | 7/2008  | Ueda          |          |
| 2010/0302663 | A1 | | 12/2010 | Szita         |          |

FOREIGN PATENT DOCUMENTS

| JP | 60069801 A   | 4/1985  |
|----|--------------|---------|
| JP | 60109004 A   | 6/1985  |
| JP | 62257605 A   | 11/1987 |
| JP | 7006306 A    | 1/1995  |
| JP | 11185393 A   | 7/1999  |
| JP | 2000311302 A | 11/2000 |
| JP | 2005025866 A | 1/2005  |
| TW | 563118 B     | 11/2003 |

* cited by examiner

*Primary Examiner* — Thang Tran
(74) *Attorney, Agent, or Firm* — Ryan, Mason & Lewis, LLP (57) ABSTRACT

A hard disk drive or other disk-based storage device comprises a storage disk, a read/write head configured to read data from and write data to the storage disk, and control circuitry coupled to the read/write head and configured to process data received from and supplied to the read/write head and to control positioning of the read/write head relative to the storage disk. The control circuitry is further configured to adjust at least one parameter of a write signal for a target bit to be written to the storage disk based on respective magnetization polarities of one or more adjacent bits previously written to the storage disk.

23 Claims, 6 Drawing Sheets

| # | BIT [K,N] | BIT [K-1,N] | BIT [K,N-1] | BIT [K-1,N-1] | WAVEFORM |
|---|---|---|---|---|---|
| 1 | 1 | 1 | 1 | 1 | KEEP lw+dl |
| 2 | 1 | 1 | 1 | 0 | lw→lw+dl |
| 3 | 1 | 1 | 0 | 1 | lw+dl→lw |
| 4 | 1 | 1 | 0 | 0 | KEEP lw |
| 5 | 1 | 0 | 1 | 1 | OS PULSE UPD |
| 6 | 1 | 0 | 1 | 0 | OS PULSE UPD |
| 7 | 1 | 0 | 0 | 1 | OS PULSE REG |
| 8 | 1 | 0 | 0 | 0 | OS PULSE REG |
| 9 | 0 | 1 | 1 | 1 | SEE #8 |
| 10 | 0 | 1 | 1 | 0 | SEE #7 |
| 11 | 0 | 1 | 0 | 1 | SEE #6 |
| 12 | 0 | 1 | 0 | 0 | SEE #5 |
| 13 | 0 | 0 | 1 | 1 | SEE #4 |
| 14 | 0 | 0 | 1 | 0 | SEE #3 |
| 15 | 0 | 0 | 0 | 1 | SEE #2 |
| 16 | 0 | 0 | 0 | 0 | SEE #1 |

DISK-BASED STORAGE DEVICE HAVING WRITE SIGNAL COMPENSATION FOR MAGNETIZATION POLARITY OF ADJACENT BITS

FIELD OF THE INVENTION

The present invention relates generally to storage devices, and more particularly to techniques for improving the operating performance of disk-based storage devices.

BACKGROUND OF THE INVENTION

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions in order to fit more tracks onto each storage disk, such that inter-track interference (ITI) becomes an important performance issue. Also, read/write head scaling is limited, so eventually the magnetic field used to write one track will impact adjacent tracks and thereby limit track density.

A number of additional techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands. Nonetheless, ITI remains an important performance issue with these and other HDD recording techniques.

The ITI performance issue may be addressed in some cases by performing ITI reduction post-processing on data read from the storage disk. However, such post-processing requires that interfering data be read from the storage and stored in memory, which can increase HDD cost and complexity while also adversely impacting other performance measures such as access time.

In these and other conventional HDD implementations, a preamplifier driving the read/write head generally provides a write signal having substantially fixed characteristics. The characteristics of the write signal waveform are usually set to optimize overall bit error rate (BER) of the HDD, which can lead to deleterious effects such as varying track widths.

SUMMARY OF THE INVENTION

Illustrative embodiments of the present invention provide HDDs or other types of disk-based storage devices that exhibit enhanced operating performance by implementing write compensation which takes into account magnetization polarities of one or more adjacent bits when writing a given target bit to a storage disk.

In one aspect, a hard disk drive or other disk-based storage device comprises a storage disk, a read/write head configured to read data from and write data to the storage disk, and control circuitry coupled to the read/write head and configured to process data received from and supplied to the read/write head and to control positioning of the read/write head relative to the storage disk. The control circuitry is further configured to adjust at least one parameter of a write signal for a target bit to be written to the storage disk based on respective magnetization polarities of one or more adjacent bits previously written to the storage disk.

By way of example, the target bit to be written to the storage disk may be a target bit to be written to a bit position K on a given track N of the storage disk and the one or more adjacent bits may include an adjacent bit previously written to bit position K on an adjacent track N−1. One or more additional adjacent bits may also or alternatively be taken into account in the write compensation when writing the target bit to bit position K on track N, such as an adjacent bit previously written to bit position K−1 on adjacent track N−1, and an adjacent bit previously written to bit position K−1 on track N. Arrangements of this type are particularly useful with shingled magnetic recording, but can be used with other types of recording techniques.

Other additional or alternative adjacent bits may be taken into account in other embodiments, including one or more adjacent bits on track N+1. As indicated above, the particular set of one or more adjacent bits taken into account when writing a target bit in a given embodiment will generally depend on the particular recording techniques used.

For example, when writing the target bit to bit position K on track N, the one or more adjacent bits to be considered may include adjacent bits previously written to bit positions K−1, K and K+1 on adjacent track N−1, an adjacent bit previously written to bit position K−1 on track N, and adjacent bits previously written to bit positions K−1, K and K+1 on adjacent track N+1. An arrangement of this type is particularly useful with bit-patterned media recording, but can be used with other types of recording techniques.

In an illustrative embodiment, the control circuitry comprises a controller and a preamplifier, with the preamplifier coupled between the controller and the read/write head. The write signal utilized to write the target bit to the storage disk may be generated by the preamplifier. The controller may comprise at least a portion of read channel circuitry of the storage device, and may be operative to adjust one or more parameters of the write signal for the target bit to be written to the storage disk by providing a control signal to the preamplifier, with the control signal causing the preamplifier to adjust the one or more parameters of the write signal. The adjusted parameter or parameters may comprise, for example, one or more of a rise time, an overshoot duration, an overshoot amplitude, and a steady state current of a write pulse of the write signal, in any combination, although additional or alternative waveshaping parameters may also be used. The control circuitry may further comprise additional storage device components, such as at least a portion of a processor and a memory.

Advantageously, one or more of the illustrative embodiments provide significant improvements in disk-based storage device performance. For example, the write compensation in one or more of the illustrative embodiments reduces corruption of adjacent bits without compromising the write of the target bit. It may result in more uniform track width, which allows track pitch to be decreased so as to permit higher storage capacity on a given storage disk, while also reducing BER by improving readout signal characteristics.

More particularly, such arrangements allow ITI to be significantly reduced, thereby improving HDD performance without requiring that ITI reduction post-processing be performed on data read from a storage disk. Also, write compensation techniques as implemented in the illustrative embodiments can be used in conjunction with various other techniques for increasing HDD storage capacity, such as shingled magnetic recording or bit-patterned media.

DETAILED DESCRIPTION OF THE INVENTION

The invention will be illustrated herein in conjunction with exemplary disk-based storage devices, controllers and associated write compensation techniques. It should be understood, however, that the invention is more generally applicable to any disk-based storage device in which improved performance in terms of reduced ITI is desired, and may be implemented using components other than those specifically shown and described in conjunction with the illustrative embodiments.

Figure 1:
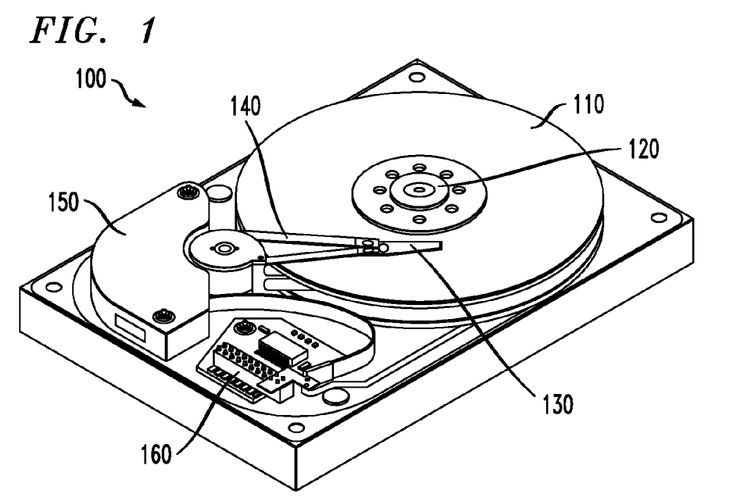
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials capable of storing data in the form of magnetization states. Such magnetization states are more generally referred to herein as "magnetization polarities." The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in the present embodiment is assumed to further include additional electronics components arranged on an opposite side of the assembly and therefore not visible in the perspective view of FIG. 1. The term "control circuitry" as used herein is therefore intended to be broadly construed so as to encompass, by way of example and without limitation, drive electronics, signal processing electronics, and associated processing and memory circuitry, as well as related mechanic elements utilized to control positioning of a read/write head relative to a storage surface of a storage disk in a storage device. A connector 160 is used to connect the storage device 100 to a host computer or other related processing device.

It is to be appreciated that, although FIG. 1 shows only a single storage disk 110, read/write head 130, and positioning arm 140, this is by way of illustrative example only, and alternative embodiments of the invention may comprise multiple instances of these and other drive components. For example, one such alternative embodiment may comprise multiple storage disks attached to the same spindle so all such disks rotate at the same speed, and multiple read/write heads and associated positioning arms coupled to one or more actuators.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The disclosed techniques are more generally applicable without limitation to any magnetic storage disk or other type of storage device application in which it is desirable to significantly reduce interference between adjacent tracks. Those skilled in the art will therefore recognize that a wide variety of other storage device configurations may be used in implementing the invention.

Figure 2:
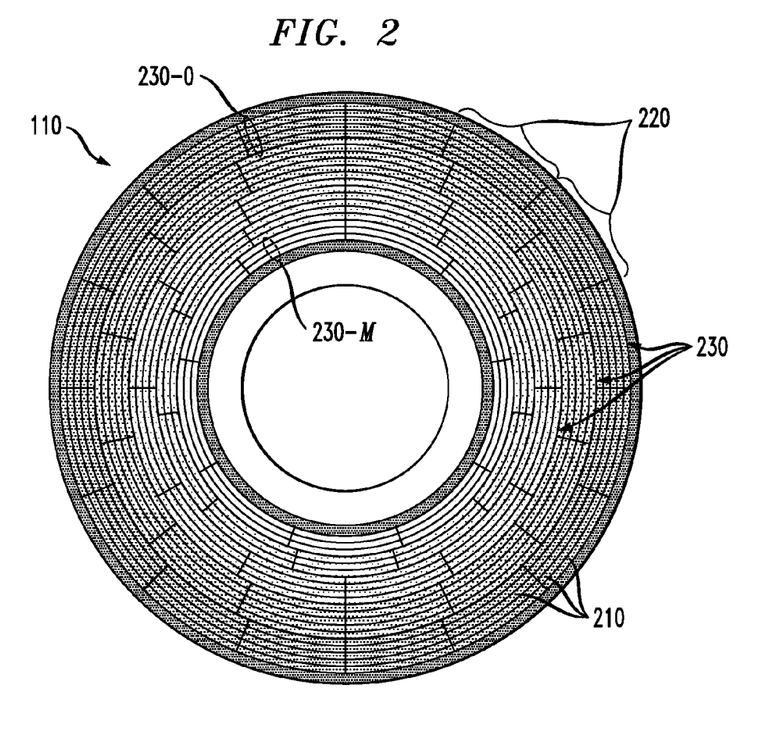
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of equally sized sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment spins at a constant angular or radial speed, regardless of the positioning of the read/write head, but the tracks of the inner zones are smaller than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of the present invention. Data bit density is generally constant across the entire storage surface of the storage disk 110, which results in higher data transfer rates at the outer zones. Since each outer zone stores more data than the inner zones, the read/write head need not be moved as frequently to read a given amount of data when accessing data in the outer zones. Data can therefore be transferred at a higher rate to or from tracks in the outer zones than to or from tracks in the inner zones.

Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two.

As one example, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

As another example, a storage disk may include 24 zones, with the fastest zone, zone 0 corresponding to zone 230-0 in FIG. 2, having a data transfer rate of 1850 Megabits per second (Mb/s) and a capacity per track of 1443 KB. The slowest zone of the storage disk, zone 23 corresponding to zone 230-M in FIG. 2, may have a data transfer rate and capacity per track of only 725 Mb/s and 748 KB, respectively. Thus, the data transfer rate varies by more than a factor of two in this example when moving from the outermost zone to the innermost zone. There are about 11,000 tracks per zone in this exemplary storage disk.

The particular data transfer rates and other features referred to in the above examples are presented for purposes of illustration only, and should not be construed as limiting in any way. A wide variety of other data transfer rates and storage disk configurations may be used in other embodiments.

As will be described below in conjunction with FIGS. 3 to 6, the storage device 100 of FIG. 1 is advantageously configured to implement write compensation which takes into account magnetization polarities of one or more adjacent bits when writing a given target bit to the storage disk 110. This significantly enhances the performance of the storage device by reducing ITI and avoiding related problems such as varying track widths.

Figure 3:
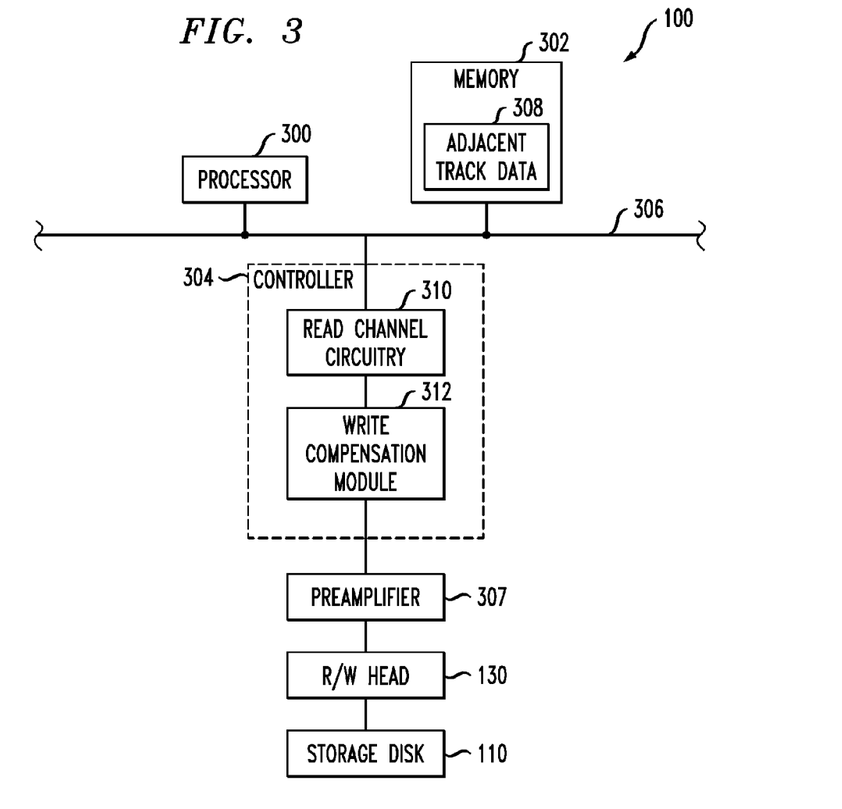
FIG. 3 is a block diagram of a portion of the storage device of FIG. 1 including a controller having a write compensation module configured to adjust a write signal which may be generated in a preamplifier for a target bit based on magnetization polarity of one or more adjacent bits.

FIG. 3 shows a portion of the storage device 100 of FIG. 1 in greater detail. In this view, the storage device 100 comprises a processor 300, a memory 302 and a controller 304, which communicate over a bus 306. The storage device further comprises a preamplifier 307 providing an interface between the controller 304 and the read/write head 130. The memory 302 stores adjacent track data 308 that is used to perform write compensation on a write signal used to write data to a given target track. The adjacent track data 308 may comprise data associated with a single adjacent track or multiple adjacent tracks, relative to a current target track, depending upon the particular recording technique used.

The controller 304 in the present embodiment is assumed to direct the operation of the read/write head 130 in reading data from and writing data to the storage disk 110. The controller 304 in the present embodiment more particularly includes read channel circuitry 310 and a write compensation module 312. As shown, the write compensation module is coupled between the read channel circuitry and the preamplifier 307, although alternative arrangements of these and other control circuitry components may be used in other embodiments.

Accordingly, the processor 300, memory 302, controller 304 and preamplifier 307 may be viewed as collectively comprising one possible example of "control circuitry" as that term is utilized herein. Numerous alternative arrangements of control circuitry may be used in other embodiments, and such arrangements may include only a subset of the components 300, 302, 304 and 307, or portions of one or more of these components.

The control circuitry of the storage device 100 as shown in FIG. 3 is therefore generally configured to process data received from and supplied to the read/write head 130 and to control positioning of the read/write head 130 relative to the storage disk 110, and is further configured to adjust at least one parameter of a write signal for a target bit to be written to the storage disk 110 based on respective magnetization polarities of one or more adjacent bits previously written to the storage disk.

In one possible implementation, the target bit to be written to the storage disk 110 may be a target bit to be written to a bit position K on a given track N of the storage disk and the one or more adjacent bits may include an adjacent bit previously written to bit position K on an adjacent track N−1. Thus, in this implementation, the polarity of the adjacent bit in the same bit position on a neighboring track is used in determining the write compensation to apply when writing the target bit on the current track. One or more additional adjacent bits may also or alternatively be taken into account in the write compensation when writing the target bit to bit position K on track N, such as an adjacent bit previously written to bit position K−1 on adjacent track N−1, and an adjacent bit previously written to bit position K−1 on track N. An example of a write compensation process that takes into account polarities of all three of the above-noted different types of adjacent bits when determining the write compensation to apply when writing the target bit on the current track will be described below in conjunction with FIGS. 5 and 6. This example is particularly well-suited for use with shingled magnetic recording.

Other additional or alternative adjacent bits may be taken into account in other embodiments, including one or more adjacent bits on track N+1. The particular set of one or more adjacent bits taken into account when writing a target bit in a given embodiment will generally depend on the particular recording techniques used.

For example, when writing the target bit to bit position K on track N, the one or more adjacent bits to be considered may include adjacent bits previously written to bit positions K−1, K and K+1 on adjacent track N−1, an adjacent bit previously written to bit position K−1 on track N, and adjacent bits previously written to bit positions K−1, K and K+1 on adjacent track N+1. An arrangement of this type is particularly useful with bit-patterned media recording, but can be used with other types of recording techniques.

As part of the write compensation process, the control circuitry may adjust one or more parameters of the write signal by selecting a particular type of write pulse for writing the target bit from among a plurality of available types of write pulses. For example, the controller 304 may be operative to adjust at least one parameter of the write signal for the target bit to be written to the storage disk 110 by providing at least one corresponding control signal to the preamplifier 307 in order to cause the preamplifier to make the needed adjustment as determined by the write compensation module 312. The adjusted parameters may include, for example, one or more of rise time, overshoot duration, overshoot amplitude, and steady state current of a given write pulse of the write signal, in any combination, although additional or alternative waveshaping parameters may also be used.

In the present embodiment, certain operations of the controller 304 may be directed by processor 300, which executes code stored in electronic memory 302. For example, the processor 300 may be configured to execute code stored in the memory 308 for performing at least a portion of a write compensation process carried out by the write compensation module 312. Thus, at least a portion of the write compensation module 312 may be implemented at least in part in the form of software code.

The memory 302 may comprise electronic memory such as random access memory (RAM) or read-only memory (ROM), in any combination. The memory 302 is an example of what is more generally referred to herein as a "computer-readable storage medium." Such a medium may of course also be writable.

The processor 300, memory 302, controller 304 and preamplifier 307 may be implemented at least in part in the form of one or more integrated circuits, such as an otherwise conventional system-on-chip (SOC) integrated circuit designed for use in an HDD and suitably modified to support write compensation for storage disk 110 as disclosed herein. An example of such an SOC that may be modified to incorporate aspects of the present invention is disclosed in disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or controller elements of a given embodiment include, for example, a microprocessor, digital signal processor (DSP), application-specific integrated circuit (ASIC), field-programmable gate array (FPGA) or other integrated circuit device.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Although shown as part of the storage device 100 in the present embodiment, the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

The manner in which one or more parameters of a write signal for a target bit to be written to storage disk 110 may be adjusted based on respective magnetization polarities of one or more adjacent bits previously written to the storage disk 110 will now be described with reference to FIGS. 4A, 4B and 4C.

Figure 4A:
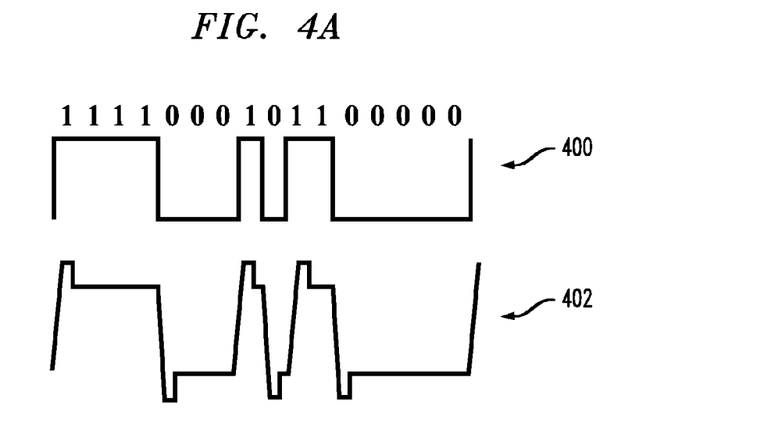
FIGS. 4A, 4B and 4C show exemplary write signals in illustrative embodiments.

FIG. 4A shows the relationship between a portion of a data signal 400 and a corresponding preamplifier output write signal 402 comprising a plurality of uncompensated overshoot (OS) write pulses.

Figure 4B:
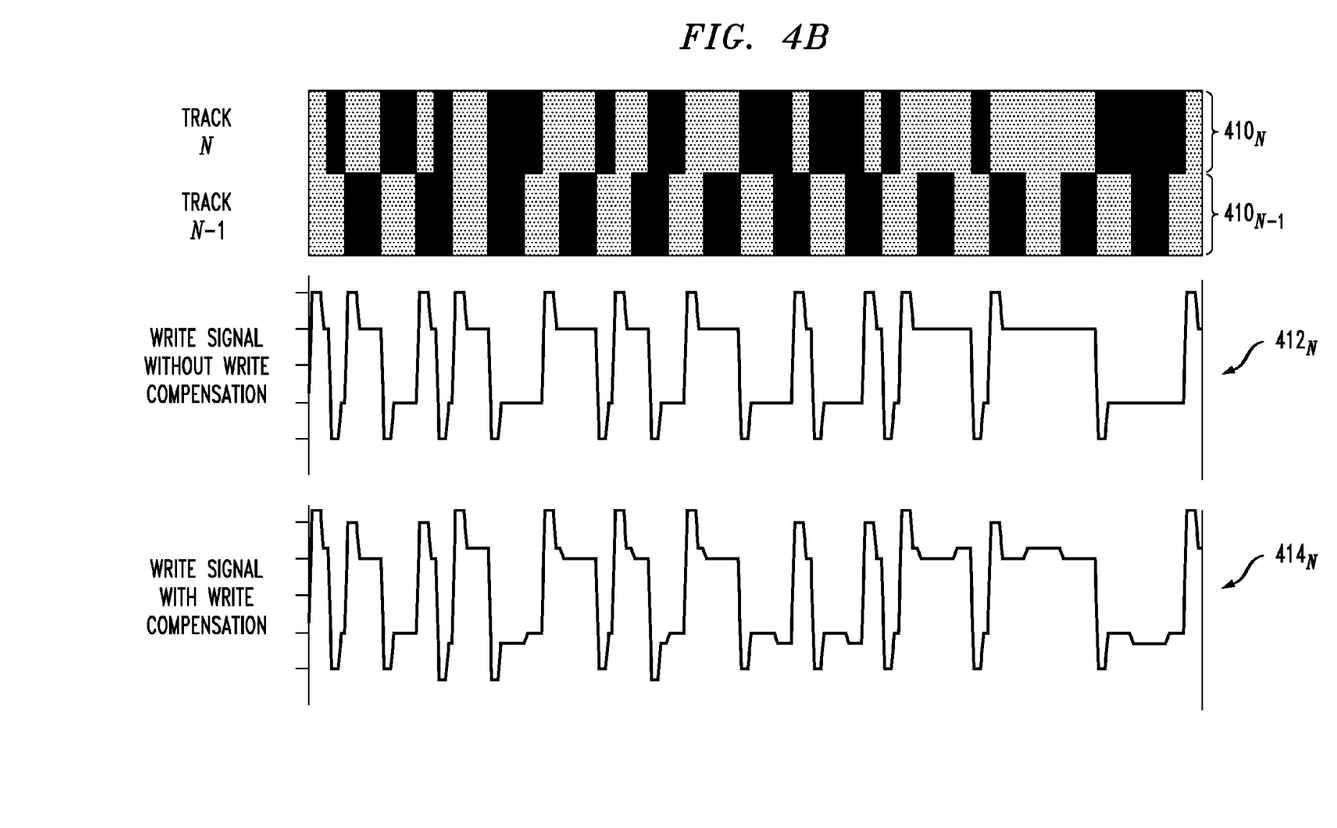

Referring now to FIG. 4B, sets of data recorded on respective current track N and adjacent track N−1 of the storage disk 110 are generally designated by reference numerals $410_N$ and $410_{N-1}$, respectively, with different shadings indicating the different magnetization polarities. An exemplary uncompensated write signal at the output of the preamplifier 307 for writing the set of data $410_N$ to track N is designated as $412_N$. The corresponding compensated write signal at the output of the preamplifier 307 for writing the set of data $410_N$ to track N taking into account the polarities of adjacent bits on track N−1 is designated as $414_N$.

Figure 4C:
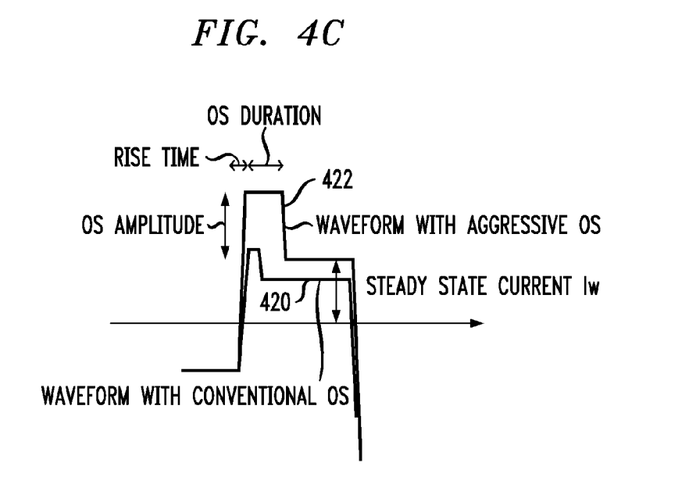

A single uncompensated overshoot write pulse waveform 420 of the preamplifier output write signal 402 of FIG. 4A is shown superimposed on a corresponding compensated or "aggressive" overshoot write pulse waveform 422 in FIG. 4C. The aggressive overshoot waveform in this particular example is characterized by higher overshoot amplitude and steady state current Iw, and faster rise time and longer overshoot duration, than the corresponding parameters of the uncompensated write pulse waveform.

It is apparent that in the compensated write signal Iw for writing the set of data $410_N$ to track N in FIG. 4B, certain of the uncompensated overshoot write pulses have been replaced with compensated or "aggressive" overshoot write pulses, based on the polarity of the corresponding adjacent bits on track N−1.

In the present embodiment, the write compensation module 312 of the controller 304 in FIG. 3 analyzes the relative polarities of the target bit on track N and its adjacent bit on track N−1, and adjusts the corresponding write pulse parameters by causing the normal uncompensated overshoot write pulse waveform to be replaced with the compensated aggressive overshoot write pulse waveform.

If only the adjacent bit K on the neighboring track N−1 is considered, there are four possible relative polarities to be considered between the target bit K on track N and the adjacent bit K on track N−1, namely, a "1" bit next to a "0" bit, a "1" bit next to a "1" bit, a "0" bit next to a "1" bit, and a "0" bit next to a "0" bit. Generally, writing the target bit K on track N is easier when the adjacent bit K on track N−1 is of the same polarity. More specifically, writing a target bit typically requires a lower magnetic field when the adjacent bit is of the same polarity and a higher magnetic field when the adjacent bit is of the opposite polarity. Accordingly, compensating the write pulse for the target bit based on the magnetization polarity of the adjacent bit allows a more uniform track width to be achieved.

Figure 5:
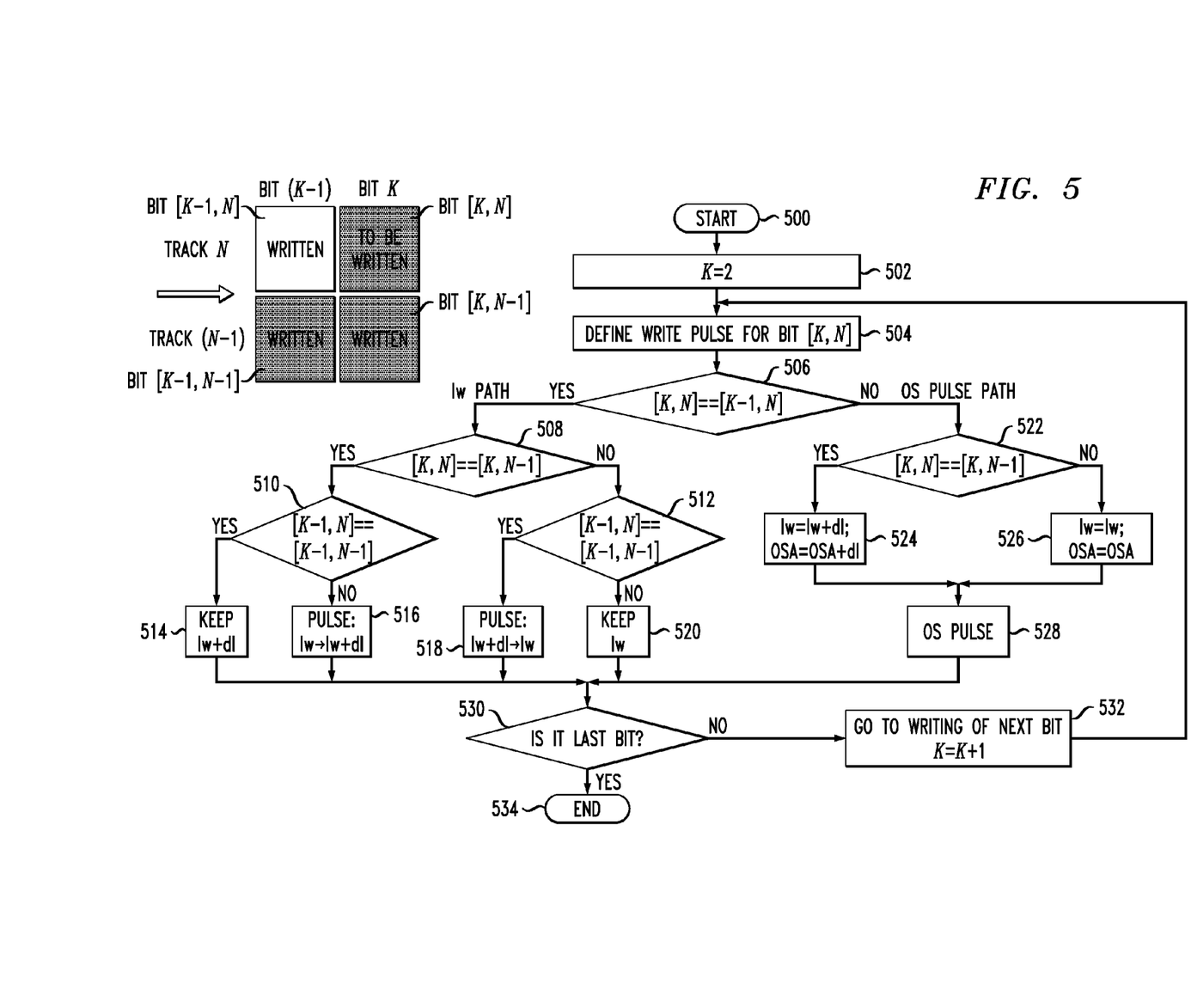
FIG. 5 is a flow diagram of a write compensation process that may be implemented in the controller of FIG. 3 in an illustrative embodiment.

FIG. 5 shows a more detailed version of an exemplary write compensation process implemented by write compensation module 312 of controller 304 in FIG. 3. This write compensation process takes into account, for a given target bit to be written to position K on track N of the storage disk 110, not only the polarity of the adjacent bit previously written to bit position K on adjacent track N−1, but also the respective polarities of the adjacent bit previously written to bit position K−1 on adjacent track N−1 and the adjacent bit previously written to bit position K−1 on track N. These bits are individually denoted as in the figure bit [k,n], where k denotes the bit position (e.g., K or K−1) and n denotes the track (e.g., N or N−1).

Figure 6:
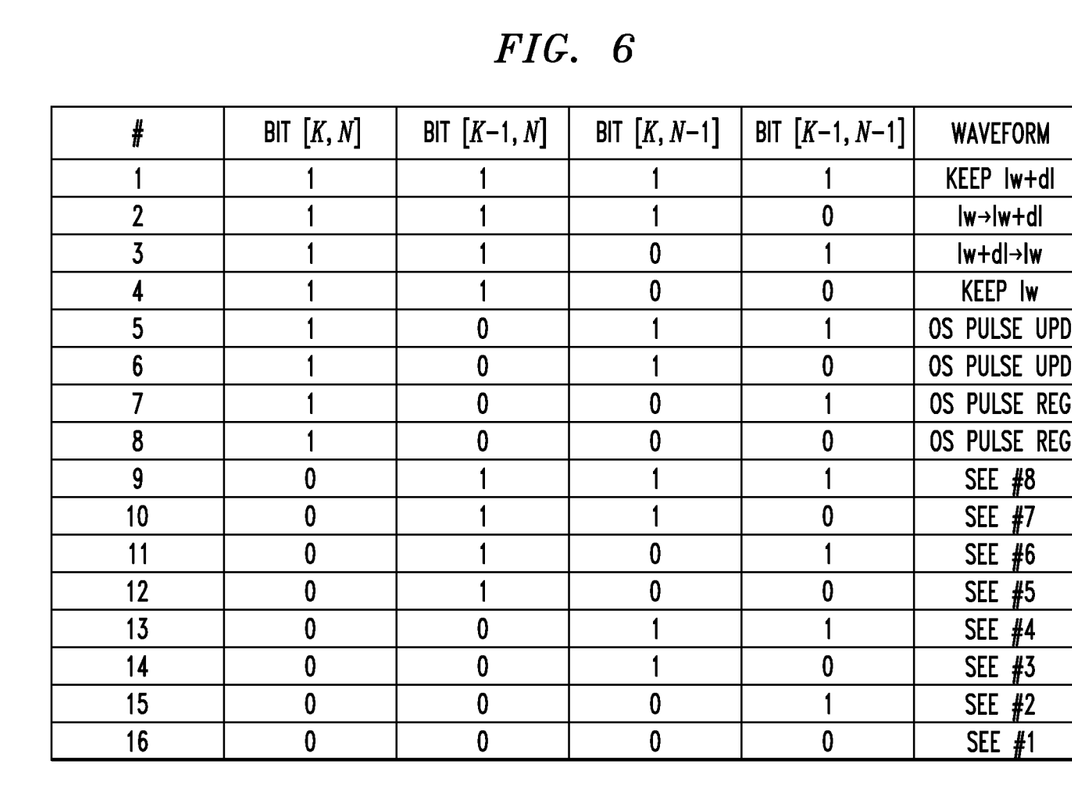
FIG. 6 is a table listing possible combinations of magnetization polarities of respective target and adjacent bits and associated write signal configurations for the write compensation process of FIG. 5.

As the polarities of four different bits are considered in the FIG. 5 write compensation process, there are $2^4=16$ different combinations of the four polarities, which are summarized in the table of FIG. 6. The table also lists the particular type of write pulse waveform selected for each of the possible combinations of the four bits.

The write compensation process as shown in FIG. 5 includes steps 500 through 534 as shown. In step 500, the process starts. The bit position K is initialized to two in step 502. The definition of the write pulse for bit [K,N] begins in step 504. There are two different paths, one referred to as the Iw path which corresponds to a sequence of two bits of the same polarity on track N and involves adjusting only the steady state current Iw, and the other referred to as the OS path which corresponds to a sequence of two bits of opposite polarities on track N and involves adjusting the overshoot write pulse waveform including possibly the steady state current Iw. A particular one of these two paths is taken based on the outcome of step 506, which determines whether the polarity of target bit [K,N] is the same as the polarity of adjacent bit [K−1,N]. If the polarity is the same, the Iw path is taken and the process moves to step 508 as indicated.

In step 508, the polarity of the target bit [K,N] is compared to the polarity of adjacent bit [K,N−1]. If the polarity is the same, the process moves to step 510, and otherwise moves to step 512.

In step 510, the polarity of bit [K−1,N] is compared to the polarity of bit [K−1,N−1]. Similarly, in step 512, the polarity of bit [K−1,N] is compared to the polarity of bit [K−1,N−1].

If step 510 indicates that the polarity of bit [K−1,N] is the same as the polarity of bit [K−1,N−1], a higher steady state current Iw+dI is maintained, as indicated in step 514. However, if step 510 indicates that the polarity of bit [K−1,N] is not the same as the polarity of bit [K−1,N−1], the write pulse is configured to replace the steady state current Iw with the higher steady state current Iw+dI, as indicated in step 516.

If step 512 indicates that the polarity of bit [K−1,N] is the same as the polarity of bit [K−1,N−1], the write pulse is configured to replace the higher steady state current Iw+dI with the steady state current Iw, as indicated in step 518. However, if step 512 indicates that the polarity of bit [K−1,N] is not the same as the polarity of bit [K−1,N−1], the steady state current Iw is maintained, as indicated in step 520.

If step 506 indicates that the polarity of target bit [K,N] is not the same as the polarity of adjacent bit [K−1,N], the OS pulse path is taken, and the process moves to step 522 as indicated.

In step 522, the polarity of the target bit [K,N] is compared to the polarity of adjacent bit [K,N−1]. If the polarity is the same, the process moves to step 524, and otherwise the process moves to step 526.

In step 524, an "aggressive" OS pulse is configured, in which the steady state current is increased from Iw to Iw+dI, and the overshoot amplitude (OSA) is increased from a nominal OSA to an aggressive OSA+dI. The corresponding write pulse waveform is also referred to as "OS pulse upd" in FIG. 6.

In step 526, a "regular" OS pulse is configured, in which the steady state current is set to Iw, and the overshoot amplitude is set to the nominal value. The corresponding write pulse waveform is referred to as "OS pulse reg" in FIG. 6.

The appropriate overshoot pulse as configured in step 524 or 526 is then generated and applied in step 528.

Once a pulse waveform is determined for target bit [K,N], the process moves from step 514, 516, 518, 520 or 528 to step 530, which determines if the current target bit is the last bit to be written, as indicated in step 530. If the current target bit is not the last bit to be written, the process increments K in step 532, and then returns to step 504 to begin defining the write pulse for that bit as shown. Otherwise, the process ends in step 534.

The various process operations shown in FIG. 5 are presented by way of illustrative example, and should not be construed as limiting in any way. In other embodiments, additional or alternative processing steps may be used, and the ordering of such steps may be varied relative to the arrangements shown.

Also, the various pulse waveforms and the manner in which the pulse waveforms are varied in dependence upon relative magnetization polarities as shown in FIG. 6 may different in other embodiments. As indicated previously, the number of adjacent bits to be considered in determining the write compensation to be applied to a given target bit may vary, and will generally depend upon the particular type of recording technique used, such as shingled magnetic recording, bit patterned media, shingled magnetic recording on bit patterned media, bit patterned media with hyper-track writing, etc.

The alignment between bits of adjacent tracks should also be considered, and the write compensation process may also take into account the particular bit alignment used, such as Cartesian, staggered, phase shift between bits on adjacent tracks, etc. For example, the read channel circuitry 310 could determine an alignment offset between tracks and provide that information to the write compensation module 312 or directly to the preamplifier 307. It is expected that such alignment information will be more readily available in embodiments that utilize bit-patterned media recording techniques.

The write signal at the output of the preamplifier 307 may be optimized to take into account all of the above-noted interactions within a given implementation, in order to minimize corruption of adjacent bits while also fully magnetizing the target bit.

Adjacent track data may be provided to the write compensation module 312 from the read channel circuitry 310. This may involve use of existing connections, such as read datapath signal lines which are unused during writes. The read channel circuitry can store such adjacent track data in memory 302 for as long as it is needed to determine the compensated write pulses for a corresponding portion of the current track.

The write compensation in the illustrative embodiments described above reduces corruption of adjacent bits without compromising the write of the target bit. As indicated previously, it may result in more uniform track width, which allows track pitch to be decreased so as to permit higher storage capacity on a given storage disk, while also reducing BER by improving readout signal characteristics. Accordingly, ITI is significantly reduced, without the need for ITI reduction post-processing to be performed on the readout signal. Also, write compensation techniques as implemented in the illustrative embodiments can be used in conjunction with various other techniques for increasing HDD storage capacity, such as shingled magnetic recording or bit-patterned media.

Figure 7:
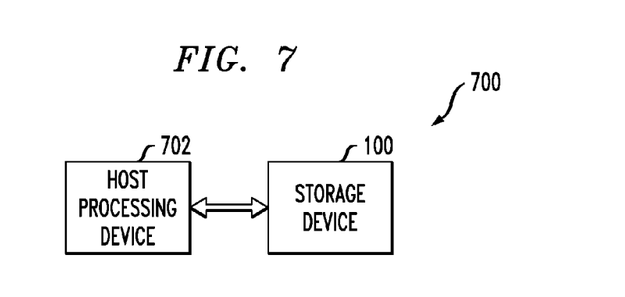
FIG. 7 illustrates interconnection of the storage device of FIG. 1 with a host processing device in a data processing system.

FIG. 7 illustrates a processing system 700 comprising the disk-based storage device 100 coupled to a host processing device 702, which may be a computer, server, communication device, etc. Although shown as a separate element in this figure, the storage device may be incorporated into the host processing device. Read/write commands directed to the storage device 100 may originate from the processing device 702, which may comprise processor and memory elements similar to those previously described in conjunction with FIG. 3.

As indicated previously, a disk-based storage device such as that shown in FIG. 7 may comprise an HDD. A given such HDD configured in the manner disclosed herein may be implemented in a virtual storage system or other type of storage virtualization system, including, by way of example, a RAID (Redundant Array of Independent Disks) system. These and other types of storage virtualization systems comprising HDDs or other disk-based storage devices as disclosed herein are considered part of the present invention. The host processing device 702 in FIG. 7 may also be an element of a storage virtualization system.

Again, it should be emphasized that the above-described embodiments of the invention are intended to be illustrative only. For example, other embodiments can use different types and arrangements of storage disks, read/write heads, control circuitry and other storage device elements for implementing the described functionality. Also, the particular manner in which write signal parameters are altered to provide write compensation for a given target bit based on the polarities of one or more adjacent bits may be varied in other embodiments. These and numerous other alternative embodiments within the scope of the following claims will be apparent to those skilled in the art.

What is claimed is:

1. A storage device comprising:
   a storage disk;
   a read/write head configured to read data from and write data to the storage disk; and
   control circuitry coupled to the read/write head and configured to process data received from and supplied to the read/write head and to control positioning of the read/write head relative to the storage disk;
   wherein the control circuitry is further configured to adjust at least one parameter of a write signal for a target bit to be written to the storage disk based on respective magnetization polarities of one or more adjacent bits previously written to the storage disk.

2. The storage device of claim 1 wherein storage device comprises a hard disk drive.

3. The storage device of claim 1 wherein the bits are written to the storage disk in accordance with a shingled magnetic recording technique.

4. The storage device of claim 1 wherein the bits are written to respective preformed magnetic islands of the storage disk with said islands being arranged in accordance with a bit-patterned media technique.

5. The storage device of claim 1 wherein the target bit to be written to the storage disk is a target bit to be written to a bit position K on a given track N of the storage disk and the one or more adjacent bits include one or more of an adjacent bit previously written to bit position K on an adjacent track N−1, an adjacent bit previously written to bit position K−1 on adjacent track N−1, and an adjacent bit previously written to bit position K−1 on track N.

6. The storage device of claim 1 wherein the target bit to be written to the storage disk is a target bit to be written to a bit position K on a given track N of the storage disk and the one or more adjacent bits include at least a subset of adjacent bits previously written to bit positions K−1, K and K+1 on an adjacent track N−1, an adjacent bit previously written to bit position K−1 on track N, and adjacent bits previously written to bit positions K−1, K and K+1 on an adjacent track N+1.

7. The storage device of claim 1 wherein said at least one parameter comprises at least one of a rise time, an overshoot duration, an overshoot amplitude, and a steady state current of a write pulse of the write signal.

8. The storage device of claim 1 wherein the control circuitry is configured to adjust said at least one parameter of the write signal for the target bit to be written to the storage disk based on the respective magnetization polarities of the one or more adjacent bits previously written to the storage disk by selecting a particular type of write pulse for writing the target bit from among a plurality of available types of write pulses based on the respective magnetization polarities of the one or more adjacent bits previously written to the storage disk.

9. The storage device of claim 1 wherein the control circuitry comprises:
   a controller; and
   a preamplifier coupled between the controller and the read/write head;
   wherein the write signal is generated by the preamplifier responsive to output from the controller and utilized to write said target bit to the storage disk.

10. The storage device of claim 9 wherein the controller further comprises at least a portion of read channel circuitry of the storage device.

11. The storage device of claim 9 wherein the controller is operative to adjust said at least one parameter of the write signal for the target bit to be written to the storage disk by providing at least one corresponding control signal to the preamplifier, said at least one control signal causing the preamplifier to adjust said at least one parameter, wherein said at least one parameter comprises at least one of a rise time, an overshoot duration, an overshoot amplitude, and a steady state current of a write pulse of the write signal.

12. The storage device of claim 1 wherein the control circuitry further comprises a processor coupled to a memory, and further wherein the processor is configured to execute code stored in the memory for adjusting the write signal for the target bit to be written to the storage disk based on the magnetization polarities of the one or more adjacent bits previously written to the storage disk.

13. A storage virtualization system comprising the storage device of claim 1.

14. A method comprising:
   writing a plurality of bits to a storage disk;
   adjusting at least one parameter of a write signal for a target bit to be written to the storage disk based on respective magnetization polarities of one or more of the plurality of bits that were previously written to the storage disk; and
   writing the target bit to the storage disk using the write signal having the adjusted parameter.

15. The method of claim 14 wherein the target bit to be written to the storage disk is a target bit to be written to a bit position K on a given track N of the storage disk and the one or more adjacent bits include one or more of an adjacent bit previously written to bit position K on an adjacent track N−1, an adjacent bit previously written to bit position K−1 on adjacent track N−1, and an adjacent bit previously written to bit position K−1 on track N.

16. The method of claim 14 wherein the target bit to be written to the storage disk is a target bit to be written to a bit position K on a given track N of the storage disk and the one or more adjacent bits include at least a subset of adjacent bits previously written to bit positions K−1, K and K+1 on an adjacent track N−1, an adjacent bit previously written to bit position K−1 on track N, and adjacent bits previously written to bit positions K−1, K and K+1 on an adjacent track N+1.

17. The method of claim 14 wherein adjusting at least one parameter of the write signal comprises adjusting at least one of a rise time, an overshoot duration, an overshoot amplitude, and a steady state current of a write pulse of the write signal.

18. A storage virtualization system comprising:
   a storage device, wherein the storage device comprises:
     at least one storage disk;

a read/write head configured to read data from and write data to the storage disk; and control circuitry coupled to the read/write head and configured to process data received from and supplied to the read/write head and to control positioning of the read/write head relative to the storage disk;

wherein the control circuitry is further configured to adjust at least one parameter of a write signal for a target bit to be written to the storage disk based on respective magnetization polarities of one or more adjacent bits previously written to the storage disk.

19. A non-transitory computer-readable storage medium having embodied therein executable code for performing the steps of the method of claim 14.

20. A processing system comprising:
a processing device; and
a storage device coupled to the processing device;
wherein the storage device comprises:
at least one storage disk;
a read/write head configured to read data from and write data to the storage disk; and control circuitry coupled to the read/write head and configured to process data received from and supplied to the read/write head and to control positioning of the read/write head relative to the storage disk;

wherein the control circuitry is further configured to adjust at least one parameter of a write signal for a target bit to be written to the storage disk based on respective magnetization polarities of one or more adjacent bits previously written to the storage disk.

21. The system of claim 20 wherein the processing device comprises a computer that incorporates the storage device.

22. The system of claim 20 wherein the storage device comprises a hard disk drive.

23. The system of claim 20 wherein the system comprises a storage virtualization system that includes said storage device.

* * * * *